United States Patent
Messing et al.

(10) Patent No.: US 11,536,248 B2
(45) Date of Patent: Dec. 27, 2022

(54) WIND POWER INSTALLATION

(71) Applicant: Wobben Properties GmbH, Aurich (DE)

(72) Inventors: Ralf Messing, Aurich (DE); Muhanad Mahmoud, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/031,400

(22) Filed: Sep. 24, 2020

(65) Prior Publication Data
US 2021/0088027 A1 Mar. 25, 2021

(30) Foreign Application Priority Data
Sep. 24, 2019 (DE) .......................... 102019125642.9

(51) Int. Cl.
*F03D 7/02* (2006.01)
*F03D 1/06* (2006.01)

(52) U.S. Cl.
CPC .......... *F03D 7/0236* (2013.01); *F03D 1/0675* (2013.01); *F05B 2240/3052* (2020.08)

(58) Field of Classification Search
CPC ...... F03D 7/022; F03D 7/0236; F03D 7/0252; F05B 2240/3052; F05B 2240/306
See application file for complete search history.

(56) References Cited

U.S. PATENT DOCUMENTS

| | | | |
|---|---|---|---|
| 8,475,129 B2 * | 7/2013 | Haans | ................... F03D 1/0675 415/914 |
| 10,352,302 B2 * | 7/2019 | Tanaka | ...................... F03D 9/25 |
| 2010/0076614 A1 | 3/2010 | Nies et al. | |
| 2010/0143123 A1 | 6/2010 | Haans et al. | |
| 2011/0103950 A1 | 5/2011 | Pesetsky et al. | |

(Continued)

FOREIGN PATENT DOCUMENTS

| | | |
|---|---|---|
| DE | 102010032676 | 2/2012 |
| DE | 102013104695 | 11/2014 |

(Continued)

*Primary Examiner* — Courtney D Heinle
*Assistant Examiner* — Sang K Kim
(74) *Attorney, Agent, or Firm* — Seed Intellectual Property Law Group LLP

(57) ABSTRACT

The present disclosure relates to a wind power installation having an aerodynamic rotor with at least one rotor blade, wherein the rotor blade has an active flow control device, which is designed to actively influence a flow over the rotor blade, wherein the flow control device comprises an opening in a rotor blade surface, referred to as a rotor blade surface opening, wherein the flow control device is configured to draw off and/or blow out air through the rotor blade surface opening air by way of a controllable air flow, wherein the wind power installation has a controller which is configured to control an amount of the controllable air flow through the rotor blade surface opening according to at least one of the following rules: if a rotational speed threshold value of a rotational speed of the rotor is exceeded, increasing the maximum controllable air flow successively with increasing rotational speed, if a torque threshold value of a torque of the rotor is exceeded, increasing the maximum controllable air flow successively with increasing torque.

13 Claims, 4 Drawing Sheets

(56) References Cited

U.S. PATENT DOCUMENTS

| | | | |
|---|---|---|---|
| 2011/0110777 A1 | 5/2011 | Abdallah et al. | |
| 2012/0128489 A1* | 5/2012 | Jeffus .................... | F03D 1/0633 |
| | | | 416/91 |
| 2012/0301296 A1* | 11/2012 | Greenblatt ............ | H04L 65/105 |
| | | | 416/1 |
| 2014/0284430 A1 | 9/2014 | Seifert et al. | |
| 2015/0132130 A1 | 5/2015 | Brown | |
| 2017/0056913 A1* | 3/2017 | Griffin .................... | F04B 35/04 |

FOREIGN PATENT DOCUMENTS

| | | |
|---|---|---|
| EP | 3115598 | 1/2017 |
| JP | 2003254226 A | 9/2003 |
| WO | 2009/025549 | 2/2009 |
| WO | 2010/133594 | 11/2010 |

* cited by examiner

WIND POWER INSTALLATION

BACKGROUND

Technical Field

The present disclosure relates to a wind power installation having an aerodynamic rotor with at least one rotor blade, wherein the rotor blade has an active flow control device, which is designed to actively influence a flow over the rotor blade.

Description of the Related Art

Vortex generators, which are used as a passive flow control measure for rotor blades of wind power installations, are known. Said vortex generators basically serve for suppressing or, put more precisely, for shifting to greater angles of attack, separation of the flow over the profile of the rotor blade. Accordingly, through the use of vortex generators, the rotor blade can be operated over a larger angle-of-attack range without a stall occurring. The large angle-of-attack range is advantageous because a wind power installation is subjected to widely different operating conditions, which in some cases even deviate greatly from the design point.

In order to ensure an installation yield which varies as little as possible and at the same time is optimized, it therefore has to be ensured that, where possible for all operating points, no flow separation occurs on the rotor blade, which flow separation can otherwise lead to considerable power losses of the wind power installation.

Known operating conditions which can lead to a critical increase in angle of attack are for example rotor blades wetted by rain or soiled in some other way, high turbulence intensity in the incident flow, high vertical shear of the bottom boundary layer in the incident flow, high horizontal shear in the incident flow if the installation is partly situated in the wake of an obstacle, or air densities reduced in comparison with the design air density. In order to be able to accommodate all of these influencing factors, vortex generators have been established as an inexpensive and effective passive flow control device. Normally, vortex generators are mounted on the suction side of the rotor blade as far as regions up to a relative rotor radius r/R=0.2-0.7, mounting on the pressure side and increasingly also in regions on the suction side up to the blade tip at r/R=0.95-1 taking place in individual cases.

The mounting of the vortex generators is however not uncritical with regard to yield and noise. Vortex generators generate longitudinal vortices in the boundary layer flow on the rotor blade, which longitudinal vortices lead to an increase in the flow speeds near the wall in the blade boundary layer, which of course reduces specifically the risk of separation of the boundary layer, the skin friction drag of course being increased at the same time, which can lead to a not inconsiderable reduction of the lift-to-drag ratio. It is known that the influence of the lift-to-drag ratio on the installation power increases significantly with progressively closer proximity to the blade tip.

A disadvantage of known vortex generators is that they exert a power-reducing influence even in operating ranges or operating points in which their stabilizing effect is not required, since for example it is not raining. Due to the existence of the stationary, that is to say permanently mounted, vortex generators, the yield is accordingly smaller than it could be if there are operating points for which the angles of attack prevailing at the rotor blade are sufficiently small and no flow separation is expected.

BRIEF SUMMARY

One or more embodiments provide a wind power installation having improved yield. In particular, one or more embodiments provide a wind power installation which invokes a stabilizing effect of vortex generators only if there is a risk of flow separation, with the disturbing interventions into the boundary layer flow being omitted in all the other cases.

Provided is a wind power installation having an aerodynamic rotor with at least one rotor blade. The rotor blade has an active flow control device, which is designed to actively influence a flow over the rotor blade. The flow control device comprises an opening in a rotor blade surface, referred to as a rotor blade surface opening, wherein the flow control device is configured to draw off and/or blow out air through the rotor blade surface opening by way of a controllable air flow. The wind power installation has a controller which is configured to control an amount of the controllable air flow through the rotor blade surface opening according to at least one of the following rules: a) if a rotational speed threshold value of a rotational speed of the rotor is exceeded, increasing the maximum controllable air flow successively with increasing rotational speed, and/or b) if a torque threshold value of a torque of the rotor is exceeded, increasing the maximum controllable air flow successively with increasing torque.

The yield of rotor blades is further increased. Basically, the effect of the vortex generators that stabilizes the boundary layer flow is used only if there is a risk of flow separation, for which purpose the active flow control device is provided. If this risk is not present, ideally all the interventions which disturb the boundary layer flow should be omitted.

The active flow control device has, by way of the input of impulse and/or energy, a similar stabilizing effect on the boundary layer flow as stationary vortex generators. The active flow control device preferably works such that, via openings in the rotor blade surface, air is blown in or drawn off in a steady or unsteady manner. The blowing-in or drawing-off results in the generation of longitudinal vortices at the openings, which longitudinal vortices lead to an increase in the flow speeds near the wall and thus to a stabilization of the boundary layer flow with respect to flow separation.

The advantage of this active flow control device is that the blowing-out or the drawing-off of the air can be activated or deactivated, that is to say realized as required. This makes it possible to eliminate a significant disadvantage of the passive vortex generators of the prior art, specifically to carry out the stabilization of the flow with respect to separation only if it is necessary due to the prevailing boundary conditions, and otherwise to refrain from said stabilization, in order then not to have to accept any power-reducing effects of the control measure.

By way of the actuation of the active flow control device, specifically, if a rotational speed threshold value of a rotational speed of the rotor is exceeded, increasing the maximum controllable air flow successively with increasing rotational speed, and/or if a torque threshold value of a torque of the rotor is exceeded, increasing the maximum controllable air flow successively with increasing torque, it is then ensured that the stabilization of the flow with respect to separation is indeed realized precisely if and only if there is a risk of separation. With this procedure, it is thus possible for the installation yield to be further increased overall.

In one embodiment, the maximum controllable air flow can be determined or expressed via the amount of a maximum wall-normal speed over the opening or the openings in the rotor blade surface. This is advantageous particularly for openings which are open normal to the surface of the rotor blade. In other cases, for example if the air flow is blown out or drawn off at an angle to the normal of the rotor blade surface, it is particularly advantageous to determine or to control the amount of the air flow as a volumetric flow rate.

In this case, to a certain extent, it may normally be assumed that the increasing stabilizing effect, that is to say hindering of flow separation on the rotor blade, increases with increasing amount of the controllable air flow.

One aspect of the present disclosure is thus based on the maximum air flow being limited. Said maximum air flow need not necessarily be constant over the entire opening or the entire rotor blade and used for control purposes, rather the regulation offers a possibility of providing different outflows in a longitudinal direction of the rotor blade, with limitation of the maximum air flow over the entire rotor blade.

According to the disclosure, it is accordingly the case that, if the rotational speed threshold value or the torque threshold value is exceeded, the maximum controllable air flow is increased successively with increasing rotational speed or increasing torque, respectively. Particularly preferably, the maximum controllable air flow is increased successively up to a second rotational speed threshold value or a second torque threshold value, which is greater than the rotational speed threshold value or torque threshold value, respectively, and if the second rotational speed threshold value or the second torque threshold value is exceeded, is no longer further increased even though the rotational speed or the torque, respectively, increases further.

Preferably, a positive value corresponds to a blowing-out, that is to say an air flow through the opening to the outside, and a negative value corresponds to a drawing-off. It is particular preferably possible for both blowing-out and drawing-off to occur in different operating ranges and/or at different positions of the rotor blade.

Preferably, the flow control device is configured to vary the amount of the air flow through the rotor blade surface opening along a rotor blade length of the rotor blade.

This is particularly advantageously implemented at constant installation rotational speed.

Here, the opening may comprise a single elongate opening, which extends substantially in the rotor blade longitudinal direction, or multiple sub-openings, for example slots or holes, which are arranged at different positions in the rotor blade longitudinal direction. The multiple sub-openings may be formed at the same position in a profile depthwise direction, or at different positions in the profile depthwise direction. For example, it is also possible for multiple rows of sub-openings to be formed at different positions in the depthwise direction of the profile and to each extend substantially in the rotor blade longitudinal direction.

Particularly preferably, provision is made of an opening in a region in the vicinity of the leading edge of the rotor blade, for example in the region from 5% to 35% of the local profile depth, preferably in a region from 15% to 35%, and particularly preferably in a region from 20% to 35%, of the local profile depth. Alternatively or additionally, provision may be made of a further opening in the region of the rotor blade trailing edge, for example in a region from 30% to 100% of the local profile depth, particularly preferably from 80% to 100% thereof. In both cases, the opening may be formed either as a single elongate opening or as multiple sub-openings.

Preferably, the controller is configured to control the amount of the controllable air flow through the rotor blade surface opening such that the amount of the air flow decreases over the rotor blade length.

Preferably, the controller is configured to control the amount of the controllable air flow through the rotor blade surface opening in a manner dependent on an air density, in particular such that the decrease in the amount over the rotor blade length decreases with lower air density.

Preferably, the controller is configured to control the amount of the controllable air flow through the rotor blade surface opening in a manner dependent on a turbulence intensity, such that the decrease in the amount over the rotor blade length increases with lower turbulence intensity.

This embodiment is based on the realization that a relatively low turbulence intensity requires blowing-out or drawing-off only in a region which is situated relatively close to the rotor blade root. The combination of this embodiment with the control in a manner dependent on the air density, for example in winter, is particularly advantageous.

Preferably, the controller is configured to vary the amount of the air flow through the rotor blade surface opening in a manner dependent on an azimuth angle of the rotor.

This allows effects of vertical and/or horizontal shear to be taken into consideration, in particular at constant installation rotational speed.

Preferably, the controller is configured to control the amount of the air flow through the rotor blade surface opening cyclically over the azimuth angle such that a greater amount of the air flow exits through the rotor blade surface opening at an azimuth position of the rotor blade with maximum distance from the bottom, referred to as the 12 o'clock position, than at the azimuth position with minimum distance from the bottom, referred to as the 6 o'clock position. This control is particularly advantageous for vertical shear with a positive shear coefficient, that is to say when the wind speeds increase with height, which is normally the case.

For situations in which the wind speed decreases with increasing height above the bottom, that is to say the wind speed is lower in the 12 o'clock position than in the 6 o'clock position, the vertical shear has a negative shear coefficient. In this case, the controller is particularly preferably configured to control the amount of the air flow through the rotor blade surface opening cyclically over the azimuth angle such that a smaller amount of the air flow exits through the rotor blade surface opening at the 12 o'clock position than at the 6 o'clock position.

This particularly preferably makes it possible to counteract a vertical wind shear, that is to say a variation in the wind speed and/or wind direction over the height.

Analogously, it is additionally or alternatively possible for a horizontal wind shear, for example due to a wake of an obstacle, to be taken into consideration by way of different controls at the two sides in the horizontal direction, referred to as the 3 o'clock position and the 9 o'clock position.

Preferably, the opening of the flow control device is formed such that an air flow exits or flows in substantially parallel to the rotor blade surface.

In this way, blowing-out/drawing-off of particularly low resistance is possible. Alternatively, the opening may be formed to be at least partially and/or sectionally inclined or parallel to the rotor blade surface, for example by way of a projection, an incline and/or an edge. In this way, air flows definable in virtually any amount and direction are conceivable.

Preferably, the air flow through the opening of the flow control device is controlled via a flow speed and/or a blowing-out or drawing-off rate using a fan coupled to the controller.

Preferably, the blowing-out or drawing-off rate is determined as a product of a surface porosity and a quotient of mean blowing-out or drawing-off speed over the opening and the relative incident flow speed of the undisturbed flow.

In this case, the surface porosity is preferably defined as a quotient of open surface area, that is to say the surface area formed by the opening or openings, and the entire rotor blade surface area.

Preferably, the opening comprises multiple sub-openings distributed over the rotor blade length. The sub-openings may be formed as a slot or as differently shaped openings, for example with a rectangular, circular, oval or arbitrarily shaped cross section.

BRIEF DESCRIPTION OF THE SEVERAL VIEWS OF THE DRAWINGS

Further advantages and preferred configurations will be described below with reference to the appended figures. In the figures.

DETAILED DESCRIPTION

Figure 1:
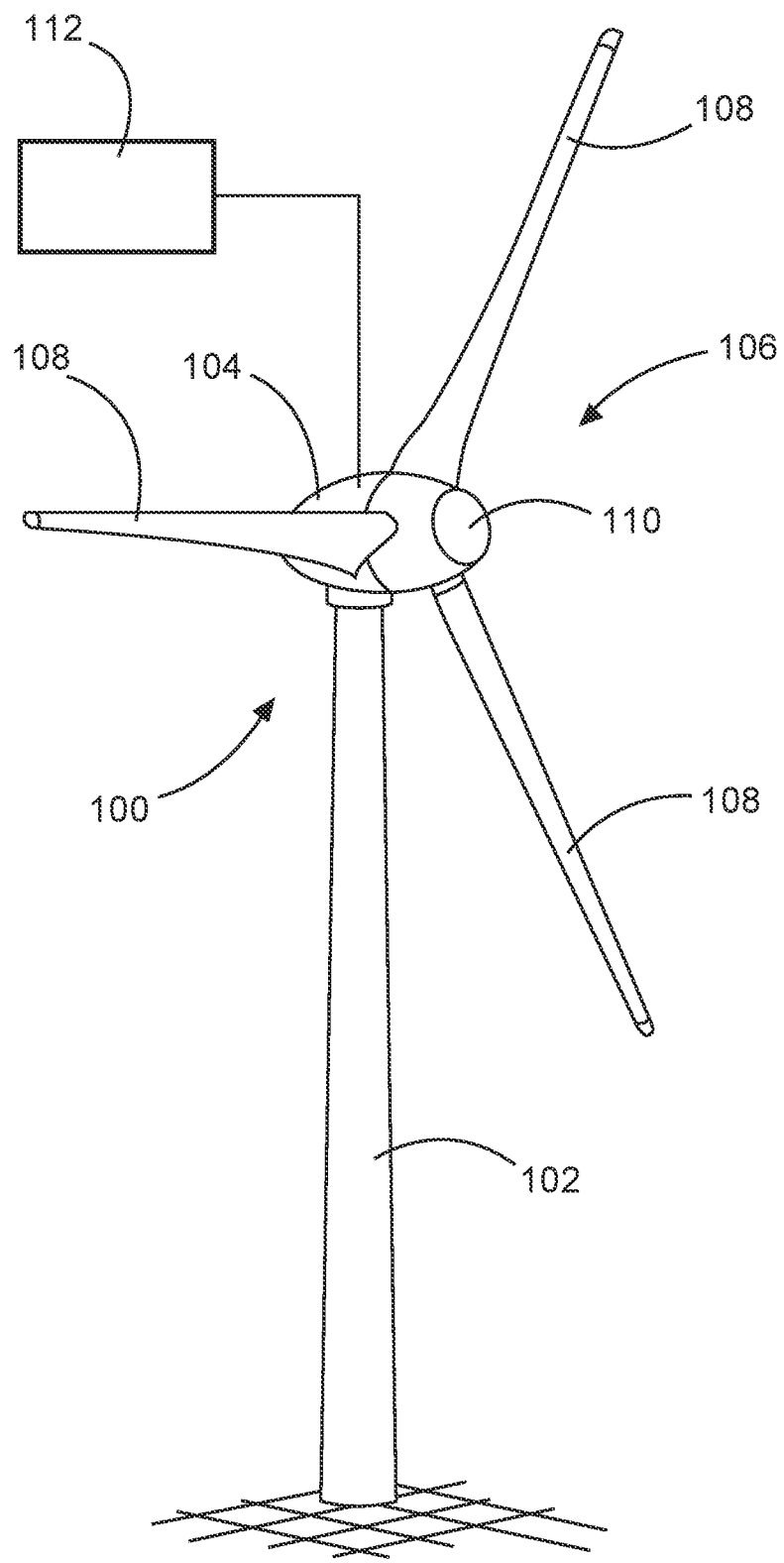
FIG. 1 shows schematically and by way of example a wind power installation.

FIG. 1 shows a schematic illustration of a wind power installation according to the disclosure. The wind power installation 100 has a tower 102 and a nacelle 104 on the tower 102. An aerodynamic rotor 106 having three rotor blades 108 and having a spinner 110 is provided on the nacelle 104. During the operation of the wind power installation, the aerodynamic rotor 106 is set in rotational motion by the wind and thereby also rotates an electrodynamic rotor or runner of a generator, which is coupled directly or indirectly to the aerodynamic rotor 106. The electric generator is arranged in the nacelle 104 and generates electrical energy. The operation of the wind power installation 100 is controlled by a controller 112. The controller 112 may be implemented completely or partially within the nacelle 104, the tower 102, or else at a distance from the wind power installation 100, for example in a central wind farm controller of a wind farm.

Figure 2:
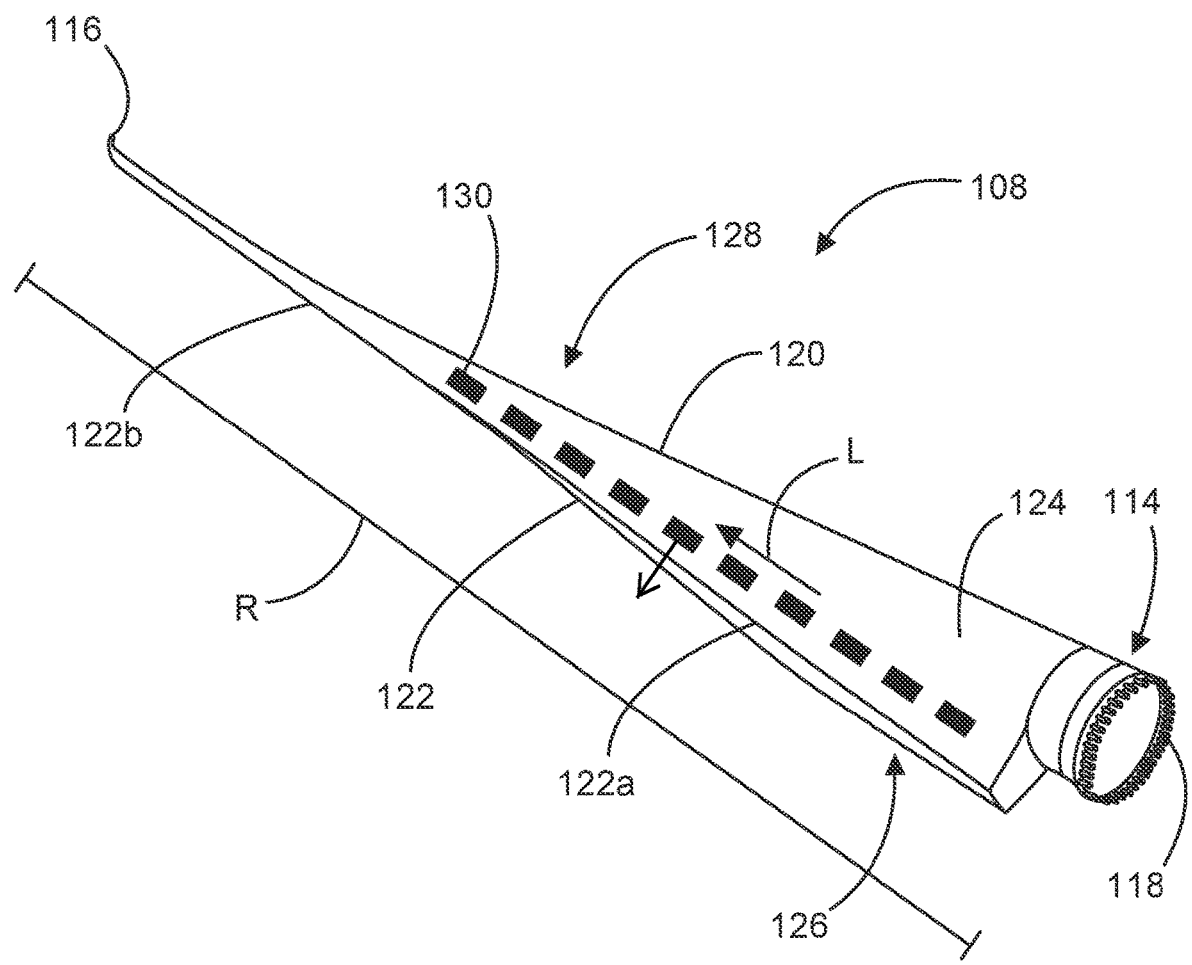
FIG. 2 shows schematically and by way of example a rotor blade.

FIG. 2 shows a schematic illustration of a rotor blade 108 of the wind power installation 100 in FIG. 1. The rotor blade 108 extends from a rotor blade root 114 to a rotor blade tip 116 in a rotor blade longitudinal direction L. The length of the rotor blade 108 in the rotor blade longitudinal direction is also referred to as the radius R, due to the use in the rotor 106.

In the region of the rotor blade root 114, provision is made of a blade connector 118 for connecting the rotor blade 108 to a rotor blade hub of the rotor 106. The pitch angles of the rotor blades 108 can be varied by pitch motors for example at the rotor blade roots 114 of the respective rotor blades 108.

Along the rotor blade longitudinal direction L, the rotor blade 108 has different aerodynamic profiles at radius positions r. Each aerodynamic profile extends from a point on the leading edge 120 to a point on the trailing edge 122, which are connected to one another via a suction side 124 and an opposite pressure side 126. At the leading edge 120, the air flow is divided into two partial flows over the suction side 124 and the pressure side 126.

The trailing edge 122 has a blunt trailing edge portion 122*a* in a region close to the hub and a sharp trailing edge portion 122*b* in a region close to the rotor blade tip 116. The thickness of the trailing edge 122 decreases substantially in the rotor blade longitudinal direction L.

FIG. 2 also shows a flow control device 128, which is designed to actively influence a flow over the rotor blade 108. The flow control device 128 comprises multiple rotor blade surface openings 130, which are formed as openings and which, in this example, are arranged at different radius positions in the rotor blade longitudinal direction L and have substantially a rectangular cross section. The flow control device 128 may have one or more fans associate therewith. The one or more fans may be inside the rotor blade 108 and are coupled to the controller 112 and actively controlled by the controller. The fans are able to blow or suction the air and have adjustable speeds that may be controlled by the controller. In another embodiment, plasma actuators may be used to control the aerodynamic flow using a high-voltage AC signal. In yet another embodiment, the size of the openings may be changes using shape memory alloys. For instance, one possibility of controlling fluid output into a boundary layer is also described in EP2771239 (which also published as U.S. Pat. Pub. No. 2014/284430), which is incorporated by reference in its entirety. The flow control device is configured to draw off and/or blow out air through the rotor blade surface opening 130 by way of a controllable air flow.

The rotor blade surface openings 130 may have any shape and be arranged on the suction side 124 and/or on the pressure side 126 at any positions and in any number. Combinations of different shapes or a single rotor blade surface opening 130 are/is also conceivable.

The disclosure lies in the actuation and regulation of the air flow, which is blown out and/or drawn off by fans through the rotor blade surface opening 130 by means of the flow control device 128. The blowing-in or drawing-off results in the generation of longitudinal vortices at the rotor blade surface openings 130, which longitudinal vortices lead to an increase in the flow speeds near the wall and thus to a stabilization of the boundary layer flow with respect to flow separation. The advantage of these active flow control measures is that the blowing-out or the drawing-off of the air can be activated or deactivated, that is to say is realized as required. Accordingly, the stabilization of the flow with respect to separation is carried out only if it is necessary due to the prevailing boundary conditions. This is refrained from in other cases, in order then not to have to accept any power-reducing effects of the control measure. With this procedure, it is thus possible for the installation yield to be further increased overall.

Some examples for the regulation of the flow control device 128 by the controller 112, which lead to an optimization of the installation yield, are discussed by way of example below with reference to FIGS. 3 to 5. The effectiveness of the active control measure by means of the flow control device 128 is characterized here via an amount of the maximum controllable air flow through the rotor blade surface opening 130 or via an amount of the maximum wall-normal speed above the rotor blade surface opening 130. A positive value corresponds to a maximum air flow/wall-normal speed of blowing-out, and a negative value corresponds to a maximum drawing-off rate/drawing-off speed, which would be established in the rotor blade surface opening 130. Generally, it may be assumed to a certain extent that, with increasing amount of the maximum air flow or speed in the rotor blade surface opening 130, it is also the case that an increasing stabilizing effect is established, that is to say flow separation on the rotor blade can be prevented.

For rotor blade surface openings 130 which allow blowing-out which takes place normal to the surface, the consideration of the air flow can be transferred easily into the maximum wall-normal speed. Differences are obtained in particular if the geometry of the rotor blade surface opening 130 gives rise to a significant tangential flow component through the rotor blade surface opening 130. In particular for these cases, the embodiments described below by way of example for the maximum wall-normal speed may be correspondingly generalized to the maximum controllable air flow.

In one embodiment, the openings 130 of the flow control device are formed such that an air flow exits or flows in substantially parallel to the rotor blade surface as shown by the arrow in FIG. 2 at one of the openings in the center area.

Figure 3:
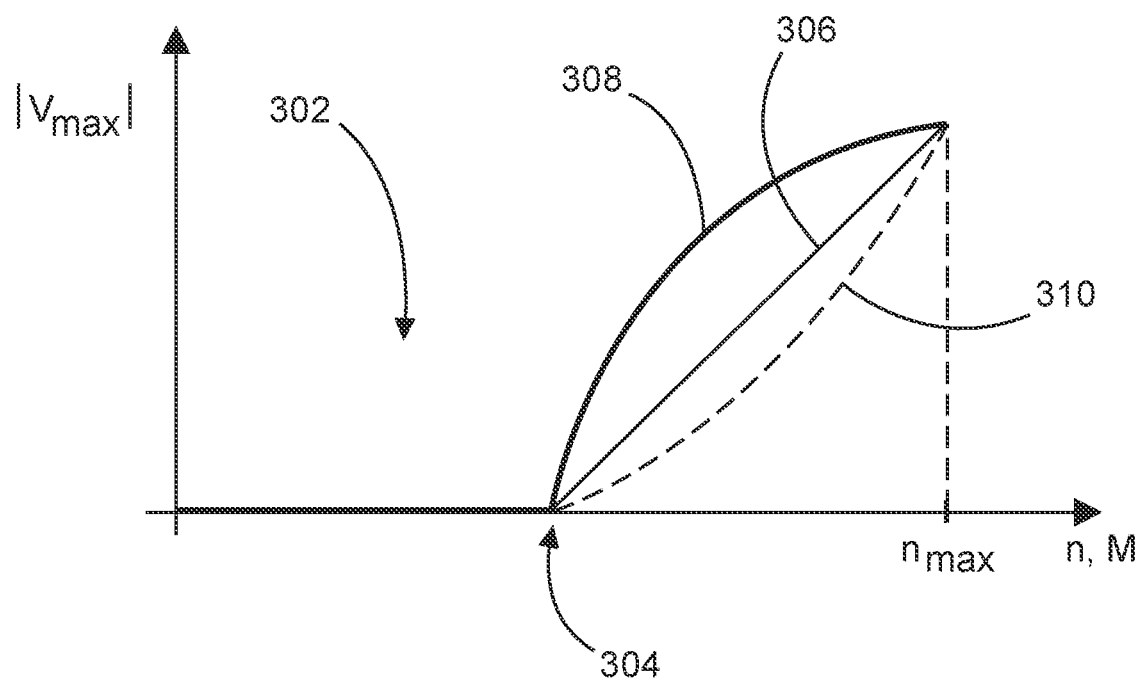
FIG. 3 shows schematically and by way of example a result of an implementation in the controller.

FIG. 3 shows schematically and by way of example a preferred implementation in the controller 112, wherein there is plotted a profile of the maximum wall-normal speed $|v_{max}|$ on the y-axis over the installation rotational speed n or the installation torque M. The amount of the maximum wall-normal speed $|v_{max}|$ increases with increasing rotational speed n, since in a part-load range 302, it is often the case that no flow separation is expected, intervention of a control measure is not required and the maximum power coefficient and yield can be realized with the rotor blade 108. With increasing wind speed and rotational speed n, the risk of highly power-reducing flow separation on the rotor blade, and thus the requirement for flow control, is increased. Therefore, the maximum wall-normal speed is correspondingly increased successively with increasing rotational speed n from a threshold value 304 of the rotational speed n up to the maximum rotational speed $n_{max}$.

The profile of the ascent of the maximum wall-normal speed $|v_{max}|$ from the threshold value 304 of the installation rotational speed n differs in a manner dependent on further operating parameters or ambient parameters and may for example be a linearly ascending profile 306, a bounded profile 308 or an exponential profile 310.

Figure 4:
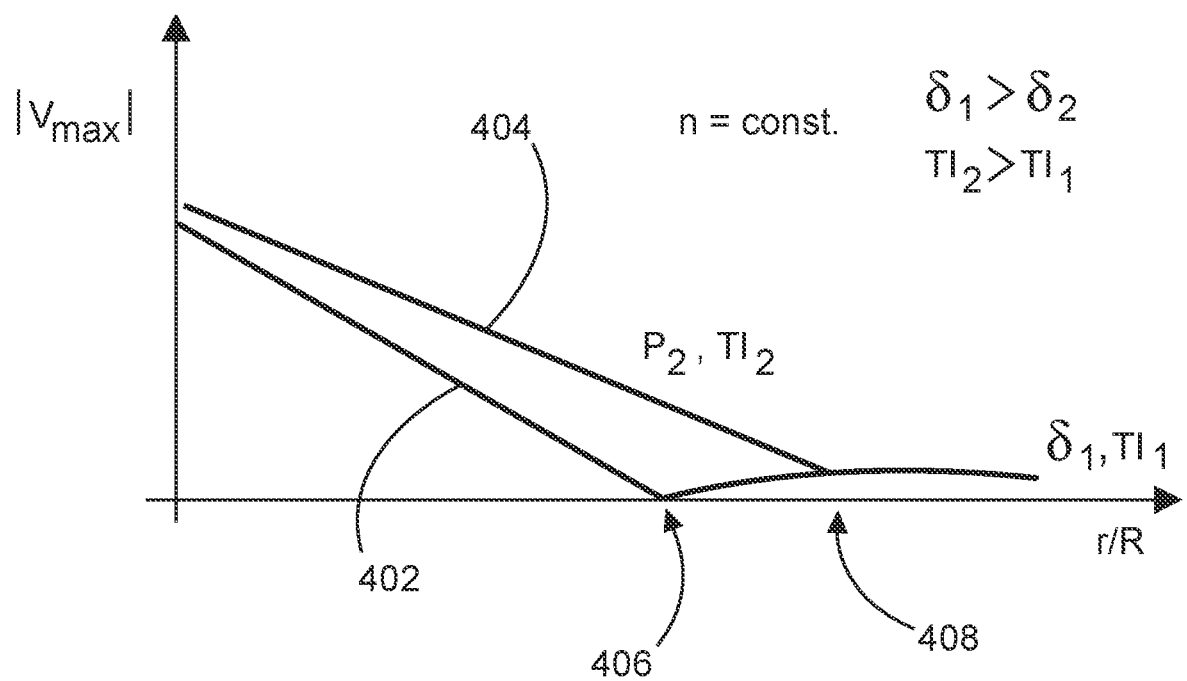
FIG. 4 shows schematically and by way of example a result of an implementation in the controller.

FIG. 4 shows schematically and by way of example the profile of the maximum wall-normal speed $|v_{max}|$ over the rotor radius r/R, normalized with respect to the maximum radius R, in each case for two air densities $\rho_1$, $\rho_2$ or two turbulence intensities $TI_1$, $TI_2$ of the incident flow at constant installation rotational speed n. One profile 402 is associated with the air density $\rho_1$ and the turbulence intensity $TI_1$. One profile 404 is associated with the air density $\rho_2$ and the turbulence intensity $TI_2$.

In this example, as mentioned for constant rotational speed n, it holds that $\rho_1 > \rho_2$ and/or $TI_2 > TI_1$. This means that the lower the air density or the higher the turbulence intensity of the incident flow, the further outward, that is to say the greater r/R is, the flow around the rotor blade has to be controlled, that is to say the amount of the maximum wall-normal speed $|v_{max}|$ in the rotor blade surface opening 130 assumes a value greater than zero. The amount of the maximum wall-normal speed $|v_{max}|$ is greater than zero up to a radius position 406 for the profile 402, and correspondingly up to a radius position 408, which is closer to the rotor blade tip than the radius position 406, for the profile 404. The amount of the maximum wall-normal speed $|v_{max}|$ correspondingly decreases from a global maximum in the region of the rotor blade root more slowly for the profile 404 than for the profile 402. Although a linear profile 404, 402 is shown, other decreasing profiles with respect to the radius position are also possible in this regard.

At many locations, an installation is subjected to a possibly highly varying turbulence intensity TI and/or, due to seasonal variations in the mean temperature, varying air densities $\rho$ too. The control measure for controlling separation is activated radially on the rotor blade 108 toward the blade tip only as far as necessary, according to the ambient conditions.

For identical turbulence intensity TI, it is for example the case that control in winter can be activated only up to relatively small radius positions r/R compared with in summer, during which the air densities $\rho$ are reduced compared with winter. A similar situation applies to the influence of the turbulence intensity TI. In this regard, many locations are subjected diurnally, that is to say within 24 hours, to a day/night cycle with negligible variation in air density $\rho$ in which a higher turbulence intensity TI in the incident flow for the wind power installation 100 prevails during solar exposure in the daytime than at night, during which the turbulence intensity TI is significantly lower. This diurnal variation would be handled by the regulation by way of the controller 112 such that the flow control is activated toward greater radius positions r/R in the daytime, with high turbulence intensity TI, than at night, when the turbulence intensity TI decreases. These are just two examples of how the factors air density $\rho$ and turbulence intensity TI advantageously influence the regulation of an active flow control measure 128 at the rotor blade 108 in order to prevent, as far as possible, separation of the flow passing around the rotor blade.

Figure 5:
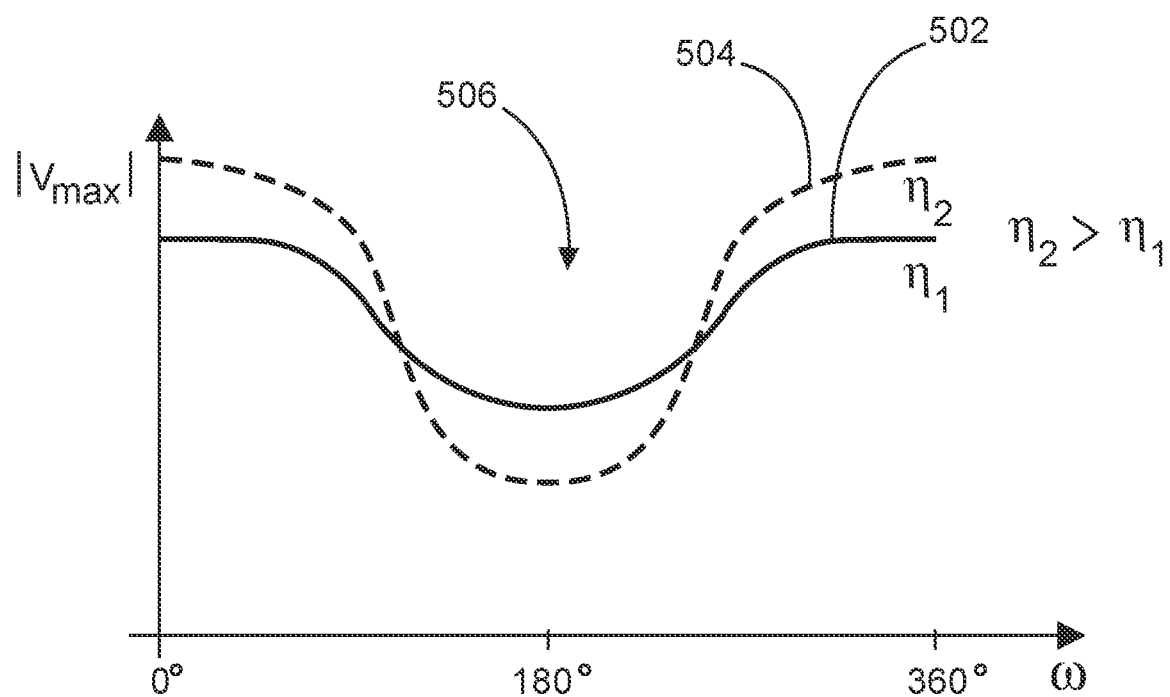
FIG. 5 shows schematically and by way of example a result of an implementation in the controller.

Finally, FIG. 5 shows schematically and by way of example the amount of the maximum wall-normal speed $|v_{max}|$ in the rotor blade surface opening 130 over the rotor azimuth $\omega$ at constant rotational speed n illustrated for different vertical shears $\eta_1$, $\eta_2$ of the bottom boundary layer of the incident flow.

Different shears $\eta$ of the bottom boundary layer often reoccur diurnally at a wind power installation 100. For high positive shear, for $\eta_2$ in the example in FIG. 5, the wind speed is in this case possibly significantly higher at relatively large distances from the bottom than close to the bottom. In FIG. 5, a profile of the maximum wall-normal speed $|v_{max}|$ for relatively lower shear $\eta_1$ in comparison with a profile 502 is illustrated, while a profile 504 for a relatively large shear $\eta_2$, $\eta_2 > \eta_1$ is illustrated.

Thus, when the rotor blade is in the so-called 12 o'clock position, that is to say the position at which the blade tip is at the greatest distance from the bottom, or in other words at 0° rotor azimuth $\omega$, then the rotor blade 108, in this position, is normally subjected to higher wind speeds $v_w$ than in the 6 o'clock position, or at 180° rotor azimuth, when the blade tip is thus at the smallest distance from the bottom. This is manifested as a low point of the maximum wall-normal speed $|v_{max}|$ for both profiles 502, 504 in a range 506.

The consequence of this is that, in the 12 o'clock position, greater angles of attack are present than in the 6 o'clock position. It is therefore preferable for the control measure to be activated in the 12 o'clock position, whereas this is not or is less necessary in the 6 o'clock position. This procedure is to be applied in a more pronounced manner, the higher the vertical shear is.

There is also the case in which negative vertical shears occur, in which therefore the wind speed decreases substantially with height. In this case, the control measure can then be activated in the 6 o'clock position, whereas this is not or is less necessary in the 12 o'clock position. In the case of negative vertical shears too, the procedure is to be applied in a more pronounced manner, the greater the shear is in terms of magnitude.

This procedure is also advantageously able to be applied in the case of horizontal shear. Pronounced horizontal shear may occur for example if a wind power installation 100 is situated with a part of its rotor disk in the wake of another wind power installation or some other obstacle. That part of the rotor disk which is situated in the wake is then subjected to lower wind speeds than that part of the rotor disk which is flowed against in an undisturbed manner.

In principle, a procedure such as that shown in FIG. 5 for vertical shear is expedient here, with the difference that, in the profile of the maximum wall-normal speed, a phase shift by 90° to the 3 o'clock or 9 o'clock position takes place.

One area of application is in particular rotor blades 108 at wind power installations 100 that have an active flow control system, for example the flow control device 128, with which, via openings in the rotor blade surface, air is blown into the boundary layer flow on the rotor blade, or drawn off through the openings, in a steady or unsteady manner. Here, the system is able to vary, in terms of amplitude and frequency, the speed of the air blown out or drawn off.

In at least one embodiment, a purpose is the optimization of yield of wind power installations by activation and active regulation of the flow control measure in the rotor blade boundary layer only when the stabilizing effect of said flow control measure is required in order to prevent highly power-reducing flow separation. If such an intervention is not required, the control measure is deactivated and has little to no damaging effect on the installation yield. The regulation of the control measure preferably takes into consideration here the wind field impinging on the wind power installation 100 and the parameters characterizing the wind field, such as turbulence intensity, vertical shear and horizontal shear, and air density, in order to determine optimum operating parameters for the flow control system, with the aim of avoiding flow separations on the rotor blade 108.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A horizontal axis wind power installation comprising:
   an aerodynamic rotor and a rotor blade coupled to the aerodynamic rotor, and
   a flow control device on the rotor blade, wherein the flow control device is configured to actively influence a flow over the rotor blade,
   wherein the flow control device comprises a rotor blade surface opening and at least one fan for providing a controllable air flow through the rotor blade surface opening,
   wherein the flow control device is configured to draw off air or blow out air or both through the rotor blade surface opening by way of the controllable air flow,
   wherein the horizontal axis wind power installation has a controller configured to control an amount of the controllable air flow through the rotor blade surface opening according to at least one of the following rules:
      if a rotational speed threshold value of a rotational speed of the rotor is exceeded, increasing a maximum controllable air flow successively with increasing rotational speed; and
      if a torque threshold value of a torque of the rotor is exceeded, increasing the maximum controllable air flow successively with increasing torque.

2. The horizontal axis wind power installation as claimed in claim 1, wherein the flow control device comprises a plurality of rotor blade surface openings along a length of the rotor blade, wherein the at least one fan of the flow control device has adjustable speeds and is configured to vary an amount of the air flow through the rotor blade surface openings along the length of the rotor blade.

3. The horizontal axis wind power installation as claimed in claim 2, wherein the controller is configured to control the amount of the controllable air flow through the rotor blade surface openings such that the amount of the air flow decreases over the length of the rotor blade.

4. The horizontal axis wind power installation as claimed in claim 3, wherein the controller is configured to control the amount of the controllable air flow through the rotor blade surface openings such that the decrease in the amount over the length of the rotor blade decreases with lower atmospheric air density.

5. The horizontal axis wind power installation as claimed in claim 3, wherein the controller is configured to control the amount of the controllable air flow through the rotor blade surface openings in a manner dependent on an atmospheric turbulence intensity, such that the decrease in the amount over the length of the rotor blade length increases with lower atmospheric turbulence intensity.

6. The horizontal axis wind power installation as claimed in claim 1, wherein the controller is configured to control the amount of the controllable air flow through the rotor blade surface opening in a manner dependent on an atmospheric air density.

7. The horizontal axis wind power installation as claimed in claim 1, wherein the controller is configured to vary an amount of the air flow through the rotor blade surface opening in a manner dependent on an azimuth angle of the rotor.

8. The horizontal axis wind power installation as claimed in claim 7, wherein the controller is configured to control the amount of the air flow through the rotor blade surface opening cyclically over the azimuth angle such that an amount of the air flow through the rotor blade surface opening is greater at an azimuth position of the rotor blade at the 12 o'clock position, than at the azimuth position at the 6 o'clock position.

9. The horizontal axis wind power installation as claimed in claim 1, wherein the rotor blade surface opening of the flow control device is sectionally inclined to a surface of the rotor blade such that an air flow exits or flows substantially parallel to the surface of the rotor blade.

10. The horizontal axis wind power installation as claimed in claim 1, wherein the flow control device is configured to control the controllable air flow by controlling at least one of a flow speed by controlling the at least one fan, and a blowing-out or drawing-off rate by controlling a size of the rotor blade surface opening.

11. The horizontal axis wind power installation as claimed in claim 10, wherein the blowing-out or drawing-off rate is determined as a multiplication of a) a surface porosity as a first factor of the multiplication and b) a quotient as a second factor of the multiplication, the quotient being a division of (i) mean blowing-out or drawing-off speed over the rotor blade surface opening as a dividend and (ii) a relative incident flow speed of an undisturbed flow as a divisor.

12. The horizontal axis wind power installation as claimed in claim 1, wherein the rotor blade surface opening includes a plurality of sub-openings distributed over a length of the rotor blade.

13. A wind power installation comprising:
- an aerodynamic rotor and a rotor blade coupled to the aerodynamic rotor, and
- a flow control device on the rotor blade, wherein the flow control device is configured to actively influence a flow over the rotor blade,
- wherein the flow control device comprises a rotor blade surface opening and at least one fan for providing a controllable air flow through the rotor blade surface opening,
- wherein the flow control device is configured to draw off air or blow out air or both through the rotor blade surface opening by way of the controllable air flow,
- wherein the wind power installation has a controller configured to control an amount of the controllable air flow through the rotor blade surface opening according to at least one of the following rules:
    - if a rotational speed threshold value of a rotational speed of the rotor is exceeded, increasing a maximum controllable air flow successively with increasing rotational speed; and
    - if a torque threshold value of a torque of the rotor is exceeded, increasing the maximum controllable air flow successively with increasing torque,
- wherein the flow control device comprises a plurality of rotor blade surface openings along a length of the rotor blade, wherein the at least one fan of the flow control device has adjustable speeds and is configured to vary an amount of the air flow through the rotor blade surface openings along the length of the rotor blade,
- wherein the controller is configured to control the amount of the controllable air flow through the rotor blade surface openings such that the amount of the air flow decreases over the length of the rotor blade, and
- wherein the controller is configured to control the amount of the controllable air flow through the rotor blade surface openings such that the decrease in the amount over the length of the rotor blade decreases with lower atmospheric air density.

\* \* \* \* \*